US011431736B2

(12) United States Patent
Brown et al.

(10) Patent No.: US 11,431,736 B2
(45) Date of Patent: Aug. 30, 2022

(54) DETECTING SYNTHETIC ONLINE ENTITIES FACILITATED BY PRIMARY ENTITIES (71) Applicant: EQUIFAX INC., Atlanta, GA (US)

(72) Inventors: Chris Brown, Columbia, SC (US); Rakesh Patel, Smyrna, GA (US); John Mullinax, Cumming, GA (US); Troy Cole, Moseley, VA (US); Julio Farach, Atlanta, GA (US); Lee Grice, Auburn, AL (US); Patrick Wadkins, Dunwoody, GA (US); Erik Strong, Doraville, GA (US); Cordell Boynes, Lawrenceville, GA (US)

(73) Assignee: EQUIFAX INC., Atlanta, GA (US)

( * ) Notice: Subject to any disclaimer, the term of this patent is extended or adjusted under 35 U.S.C. 154(b) by 433 days.

(21) Appl. No.: 16/623,699

(22) PCT Filed: Jun. 29, 2018

(86) PCT No.: PCT/US2018/040245
§ 371 (c)(1),
(2) Date: Dec. 17, 2019

(87) PCT Pub. No.: WO2019/006272
PCT Pub. Date: Jan. 3, 2019

(65) Prior Publication Data
US 2020/0145436 A1 May 7, 2020

Related U.S. Application Data (60) Provisional application No. 62/527,660, filed on Jun. 30, 2017.

(51) Int. Cl.
*H04L 29/06* (2006.01)
*H04L 9/40* (2022.01)
(Continued)

(52) U.S. Cl.
CPC ...... *H04L 63/1416* (2013.01); *G06F 16/2379* (2019.01); *G06F 21/62* (2013.01); *G06Q 20/4016* (2013.01); *G06Q 40/02* (2013.01)

(58) Field of Classification Search
CPC .. G06Q 40/02; G06Q 20/227; G06Q 20/4016; G06Q 20/405; G06F 21/554;
(Continued)

(56) References Cited

U.S. PATENT DOCUMENTS 5,461,699 A 10/1995 Arbabi et al.
7,330,871 B2 2/2008 Barber
(Continued)

FOREIGN PATENT DOCUMENTS

KR 101364763 B1 2/2014
WO 2014160296 A1 10/2014
WO 2016154419 A1 9/2016

OTHER PUBLICATIONS

PCT/US2018/040245, "International Search Report and Written Opinion", dated Nov. 26, 2018, 15 pages.
(Continued)

*Primary Examiner* — Scott S Trotter
(74) *Attorney, Agent, or Firm* — Kilpatrick Townsend & Stockton LLP (57) ABSTRACT In some aspects, a computing system can generate entity links between a primary entity object identifying a primary entity for multiple accounts and secondary entity objects identifying secondary entities from the accounts. The computing system can determine a rate at which secondary users change on the accounts. The computing system can update, based on the determined rate, the primary entity object to include a fraud-facilitation flag. The computing system can also service a query from a client system regarding a presence of a fraud warning for a target consumer associated
(Continued)

with a consumer system that accesses a service provided with the client system. For instance, the computing system can generate a fraud warning based on the target consumer being identified in a secondary entity object associated with the primary entity object having the fraud-facilitation flag. The computing system can transmit the fraud warning to the client system.

20 Claims, 5 Drawing Sheets

(51) Int. Cl.
  *G06F 16/23* (2019.01)
  *G06F 21/62* (2013.01)
  *G06Q 20/40* (2012.01)
  *G06Q 40/02* (2012.01)

(58) Field of Classification Search
  CPC .... G06F 21/552; G06F 21/62; G06F 16/2379; H04L 63/1416
  See application file for complete search history.

(56) References Cited

U.S. PATENT DOCUMENTS

| | | |
|---|---|---|
| 8,799,122 B1 | 8/2014 | Del Favero et al. |
| 9,076,107 B2 | 7/2015 | Cameron et al. |
| 9,336,483 B1 | 5/2016 | Abeysooriya et al. |
| 9,342,793 B2 | 5/2016 | Williamson |
| 2007/0011114 A1 | 1/2007 | Chen et al. |
| 2011/0184898 A1 | 7/2011 | Lan et al. |
| 2012/0150764 A1 | 6/2012 | Sadegh |
| 2014/0108251 A1 | 4/2014 | Anderson et al. |
| 2015/0161522 A1 | 6/2015 | Saon et al. |
| 2016/0044048 A1* | 2/2016 | Hamidi ............... H04L 63/1425 726/22 |
| 2016/0210631 A1 | 7/2016 | Ramasubramanian et al. |

OTHER PUBLICATIONS

European Patent Application No. 18825395.9, "Extended European Search Report", dated Feb. 2, 2021, 8 pages.

\* cited by examiner

DETECTING SYNTHETIC ONLINE ENTITIES FACILITATED BY PRIMARY ENTITIES

CROSS REFERENCE TO RELATED APPLICATIONS

This disclosure claims the benefit of priority of U.S. Provisional Application No. 62/527,660 and filed on Jun. 30, 2017, which is hereby incorporated in its entirety by this reference.

TECHNICAL FIELD

This disclosure relates generally to computers and digital data processing systems for increasing a system's protection of data from compromised or unauthorized disclosure, and more particularly to increasing cybersecurity by preventing unauthorized access to interactive computing environments and other systems by synthetic online entities, such as (but not limited to) false entities established with for fraudulent purposes.

BACKGROUND

Interactive computing environments, such as web-based applications or other online software platforms, allow users to perform various computer-implemented functions through graphical interfaces. A given interactive environment can allow a user device to access different graphical interfaces providing different types of functionality, such as searching databases for different content items, selecting the content items by storing them in a temporary memory location, and causing a server to perform one or more operations based on a selected combination of content items.

But individuals engaging in fraud or other unauthorized online activity may use the relative anonymity provided by the Internet to access various functions within an interactive computing environment. For instance, these may create deep, fake entities. For example, a synthetic identity may be generated by creating fake documentation such as fake birth certificates, fake Social Security numbers, etc. Therefore, the synthetic identity may be associated with a sufficient volume or diversity of online transactions to appear authentic, especially when used to access an interactive computing environment over the Internet.

A synthetic identity can pose risks that are absent from other types of fraudulent activity. For example, outside the realm of electronic transactions, the same individual could not simultaneously pose as a first individual applying for a loan and a second individual co-signing on a loan without drawing suspicion. But a first synthetic identity and a second synthetic identity could perform the same transaction without appearing suspicious to the automated computing system that services the loan application. Thus, individuals that have created synthetic entities can use the relative anonymity provided by the Internet to remotely access an interactive computing environment via a data network, thereby presenting unique risks of fraud or other unauthorized use of online functions.

BRIEF DESCRIPTION OF THE FIGURES

Various features, aspects, and advantages of the present disclosure are better understood by reading the Detailed Description with reference to the accompanying drawings.

SUMMARY

Some aspects involve detecting synthetic online entities, such as (but not limited to) false entities established with interactive computing environments for fraudulent purposes. In one example, a fraud detection server can generate entity links between a primary entity object identifying a primary entity for multiple accounts and secondary entity objects identifying secondary entities from the accounts. The fraud detection server can determine a rate at which secondary users change on the accounts. The fraud detection server can update, based on the determined rate, the primary entity object to include a fraud-facilitation flag. The fraud detection server can also service a query from a client system regarding a presence of a fraud warning for a target consumer associated with a consumer system that accesses a service provided with the client system. For instance, the fraud detection server can generate a fraud warning based on the target consumer being identified in a secondary entity object associated with the primary entity object having the fraud-facilitation flag. The fraud detection server can transmit the fraud warning to the client system.

DETAILED DESCRIPTION

Existing systems can prove ineffective for preventing unauthorized access to interactive computing environments and other services via synthetic identities. A synthetic identity can be an online identity that is created for fraudulent purposes or other illicit purposes. The synthetic identity lacks a complete match to a real person or other entity across all of its personally identifiable information ("PII") or other identification information. Existing systems for detecting synthetic identities can be less effective if the synthetic identities are linked to certain fraud facilitators, such as credit mules. An example of a credit mule is an individual or other entity whose online identity has extensive indicators of authenticity and who allows other individual or entities, such as entities associated with synthetic identities, to use those indicators of authenticity to maintain or support the synthetic identities. For example, a primary entity may have a high credit score, which is indicative of the primary entity being a real person rather than being a synthetic identity. This primary entity may be considered a verified entity, since the extensive indicators of authenticity allow the entity's online identity to be verified as authentic rather than synthetic. The primary entity can allow secondary entities (sometimes known as "credit renters") to be added to one or more of the primary entity's accounts, such as credit card accounts. A secondary entity's synthetic identity will appear to be authentic due to the secondary entity's presence on the verified entity's account. For example, most financial institutions allow the addition of authorized users on a primary account with little or no verification. Thus, the presence of the secondary entities on the verified entity's account can indicate that the secondary entities are also authentic, even if they are actually synthetic.

Certain aspects and features of the present disclosure involve detecting indicators of synthetic identities by identifying primary entities whose accounts have been used for fraud facilitation. For example, a fraud detection computing system, which can be used to help identify entities involved in fraud or fraud facilitation, can analyze relationships among online entities and, in some cases, their electronic transactions. Based on this analysis, the fraud detection computing system can determine that certain primary entities (e.g., authorized users on a credit account) have likely been adding secondary users to their accounts, where the secondary users are actually synthetic identities. This determination can be performed based on the rate at which secondary users are added or removed, the ratio between existing users and terminated users, or some combination thereof. Based on this determination, the fraud detection computing system can apply a fraud-facilitation flag to a primary entity object, such as a consumer profile, for the primary entity. The fraud detection computing system can subsequently use the fraud-facilitation flag to provide, in real time, fraud warnings to client computing systems that are involved in online transactions with potential synthetic identities, where the potential synthetic identities have been established or maintained through their association with the fraud-facilitating primary entity.

Some examples of these aspects can overcome one or more of the issues identified above by identifying potential fraud facilitators, such as entities having a higher probability of being credit mules. For example, a fraud detection system can analyze historical account and transaction activity for a primary entity and thereby identify indicators of a primary entity having a higher probability of being a fraud facilitator. An example of these indicators is an excessive number of secondary entities being authorized as users on one or more of the primary entity's accounts and then being terminated from the primary entity's accounts. Another example of these indicators is the absence or presence of transactions by the secondary entities using these accounts while the secondary entities are authorized as users on these accounts. Based on these indicators, the fraud detection system can classify a primary entity as a potential fraud facilitator by analyzing millions or billions of electronic account records, online transactions, etc. The fraud detection system can then use this classification to determine, in real-time during an electronic transaction between a third-party interactive computing environment and a target consumer, that the target consumer may be a synthetic identity due to the target consumer being linked to the fraud facilitator. For example, the fraud detection system can "flag" credit applicants in real-time based on these indicators.

In some aspects, the fraud detection system can provide a single point-of-interface for different clients' systems that provide interactive computing environments having sensitive data (e.g., online financial services, across different business entities within a banking system as a whole, etc.). The fraud detection system's role as a common point-of-interface to a fraud detection service facilitates real-time identification of potentially synthetic identities. For instance, the fraud detection system can securely aggregate account and transaction data from multiple contributor systems, generate accurate indicators of fraud facilitation or synthetic identity fraud, and provide fraud warnings to client computing systems. Providing this secure point-of-interface facilitates regular updates to the account and transaction data from multiple contributor systems and can provide access to accurate fraud warnings that are generated using data from multiple consumer and accounts identified in the data from the contributor systems.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Synthetic Identity Service

Figure 1:
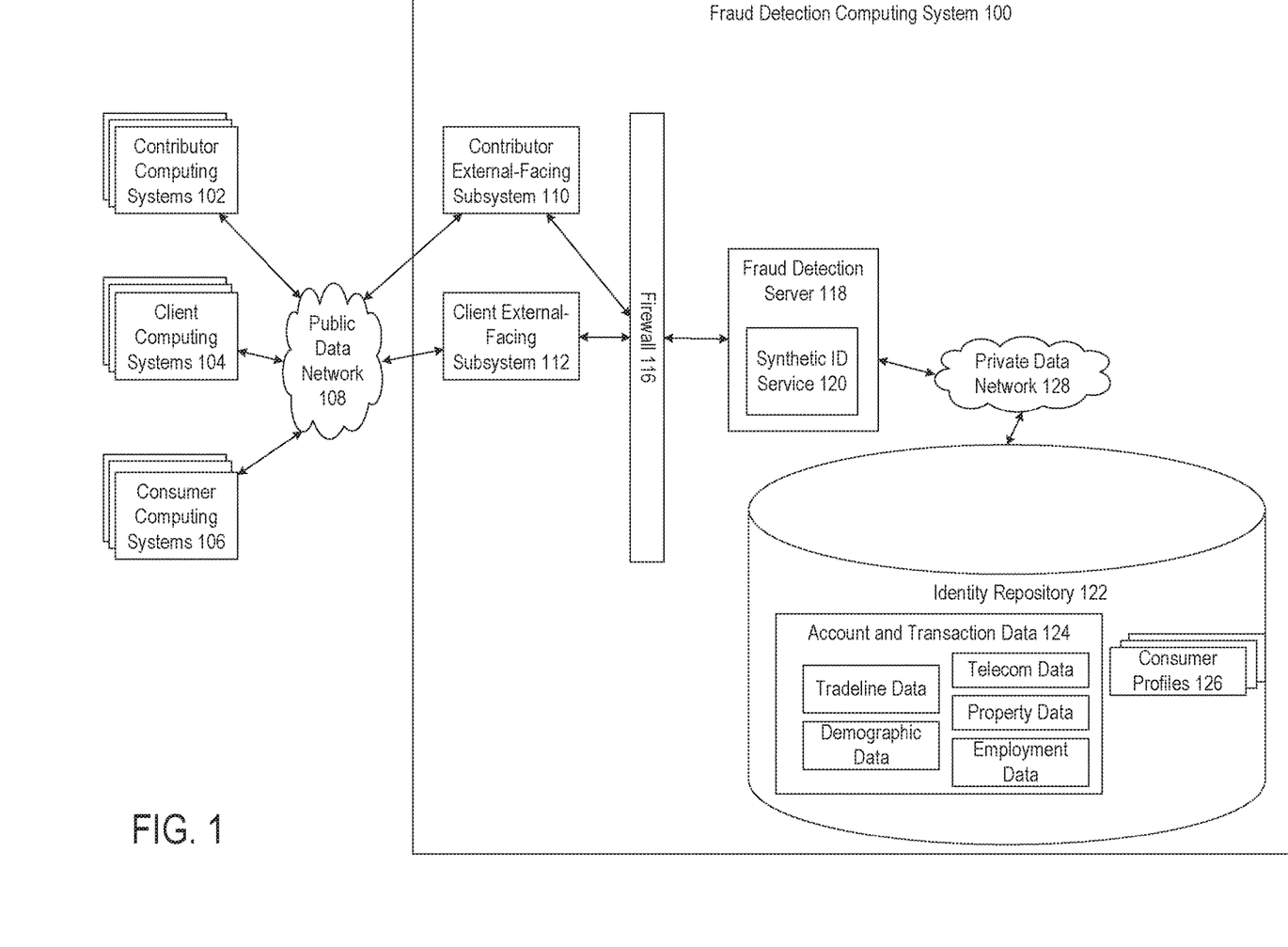
FIG. 1 depicts an example of an operating environment in which a synthetic identity service identifies primary entity objects that facilitate the creation, maintenance, or use of synthetic identities, according to certain aspects of the present disclosure.

Referring now to the drawings, a block diagram depicting an example of an operating environment in which a fraud detection service identifies accounts with indicators of facilitating synthetic online identities and services queries regarding potential synthetic online identities FIG. 1 is a block diagram depicting an example of an operating environment in which a synthetic identity service 120 identifies primary entity accounts potentially used to facilitate the creation, maintenance, or use of synthetic identities and services queries involving secondary entities associated with these primary entity accounts. FIG. 1 depicts examples of hardware components of a fraud detection computing system 100, according to some aspects. The fraud detection computing system 100 is a specialized computing system that may be used for processing large amounts of data using a large number of computer processing cycles.

The numbers of devices depicted in FIG. 1 are provided for illustrative purposes. Different numbers of devices may be used. For example, while certain devices or systems are shown as single devices in FIG. 1, multiple devices may instead be used to implement these devices or systems.

The fraud detection computing system 100 can communicate with various other computing systems, such as contributor computing systems 102 and client computing systems 104. For example, contributor computing systems 102 and client computing systems 104 may send data to the fraud detection server 118 to be processed or may send signals to the fraud detection server 118 that control or otherwise influence different aspects of the fraud detection computing system 100 or the data it is processing. The client computing systems 104 may also interact with consumer computing systems 106 via one or more public data networks 108 to facilitate electronic transactions between users of the consumer computing systems 106 and interactive computing environments provided by the client computing systems 104. For instance, an individual can use a consumer computing system 106, such as a laptop or other end-user device, to access an interactive computing environment hosted by a client computing system 104. Examples of the interactive computing environment include a mobile application specific to a particular client computing system 104, a web-based application accessible via mobile device, etc. An electronic transaction between the consumer computing system 106 and the client computing system 104 can include, for example, the consumer computing system 106 being used to query a set of sensitive or other controlled data, submit an online credit card application or other digital application to the client computing system 104 via the interactive computing environment, operating an electronic tool within an interactive computing environment hosted by the client computing system (e.g., a content-modification feature, an application-processing feature, etc.).

The contributor computing systems 102 and client computing systems 104 may interact, via one or more public data networks 108, with various external-facing subsystems of the fraud detection computing system 100. The fraud detection computing system 100 can also include a contributor external-facing subsystem 110 and a client external-facing subsystem 112. Each external-facing subsystem includes one or more computing devices that provide a physical or logical subnetwork (sometimes referred to as a "demilitarized zone" or a "perimeter network") that expose certain online functions of the fraud detection computing system 100 to an untrusted network, such as the Internet or another public data network 108. In some aspects, these external-facing subsystems can be implemented as edge nodes, which provide an interface between the public data network 108 and a cluster computing system, such as a Hadoop cluster used by the fraud detection computing system 100.

Each external-facing subsystem is communicatively coupled, via a firewall device 116, to one or more computing devices forming a private data network 128. The firewall device 116, which can include one or more devices, creates a secured part of the fraud detection computing system 100 that includes various devices in communication via the private data network 128. In some aspects, by using the private data network 128, the fraud detection computing system 100 can house the identity repository 122 in an isolated network (i.e., the private data network 128) that has no direct accessibility via the Internet or another public data network 108.

Each contributor computing system 102 may include one or more third-party devices (e.g., computing devices or groups of computing devices), such as individual servers or groups of servers operating in a distributed manner. A contributor computing system 102 can include any computing device or group of computing devices operated by an online merchant, an e-commerce system, an employer, a payroll system, a human-resource management system, an insurance provider system, a healthcare provider system, a government data-provider system, etc. The contributor computing system 102 can include one or more server devices. The one or more server devices can include or can otherwise access one or more non-transitory computer-readable media. The contributor computing system 102 can also execute an interactive computing environment. The interactive computing environment can include executable instructions stored in one or more non-transitory computer-readable media. The contributor computing system 102 can further include one or more processing devices that are capable of storing, formatting, and transmitting income data, employment data, or both to a fraud detection computing system 100.

Each client computing system 104 may include one or more third-party devices, such as individual servers or groups of servers operating in a distributed manner. A client computing system 104 can include any computing device or group of computing devices operated by a seller, lender, or other provider of products or services. The client computing system 104 can include one or more server devices. The one or more server devices can include or can otherwise access one or more non-transitory computer-readable media. The client computing system 104 can also execute instructions that provides an interactive computing environment accessible to consumer computing systems 106. The executable instructions stored in one or more non-transitory computer-readable media. The client computing system 104 can further include one or more processing devices that are capable of providing the interactive computing environment to perform operations described herein. In some aspects, the interactive computing environment can provide an interface (e.g., a website, web server, or other server) to facilitate electronic transactions involving a user of a consumer computing system 106. The interactive computing environment may transmit data to and receive data from the consumer computing system 106 to enable a transaction.

A consumer computing system 106 can include any computing device or other communication device operated by a user, such as a consumer or buyer. The consumer computing system 106 can include one or more computing devices, such as laptops, smart phones, and other personal computing devices. A consumer computing system 106 can include executable instructions stored in one or more non-transitory computer-readable media. The consumer computing system 106 can also include one or more processing devices that are capable of executing program code 106 to perform operations described herein. In various examples, the consumer computing system 106 can allow a user to access certain online services from a client computing system 104, to engage in mobile commerce with a client computing system 104, to obtain controlled access to electronic content hosted by the client computing system 104, etc. For instance, the user or other entity accessing the consumer computing system 106 can use the consumer computing system 106 to engage in an electronic transaction with a client computing system 104 via an interactive computing environment.

Each communication within the fraud detection computing system 100 may occur over one or more data networks, such as a public data network 108, a private data network 128, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network.

A data network may include network computers, sensors, databases, or other devices that may transmit or otherwise provide data to fraud detection computing system 100. For example, a data network may include local area network devices, such as routers, hubs, switches, or other computer networking devices. The data networks depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

The fraud detection computing system 100 can include one or more fraud detection servers 118. The fraud detection server 118 may be a specialized computer or other machine that processes the data received within the fraud detection computing system 100. The fraud detection server 118 may include one or more other systems. For example, the fraud detection server 118 may include a database system for accessing the network-attached storage unit, a communications grid, or both. A communications grid may be a grid-based computing system for processing large amounts of data.

In some aspects, the fraud detection server 118 can use data obtained from contributor computing systems 102 to facilitate the real-time provision of fraud-related information, such as indicators that a target consumer is a synthetic identity, to client computing systems 104 that engage in electronic transactions with consumer computing systems 106. This provision of information facilitates real-time detection of potential fraudulent activity in electronic transactions. This real-time detection can occur during an electronic transaction between the client computing system 104 and a consumer computing system 106. The fraud detection computing system 100 can communicate with the client systems in a manner that is out of band with respect to the contributor computing systems 102, the client computing systems 104, the consumer computing systems 106, or both. For example, the communications between the fraud detection computing system 100 and a contributor computing system 102 can be performed via a separate communication channel, session, or both as compared to the communication channel or session established between the fraud detection computing system 100 and a client computing system 104.

The fraud detection server 118 can include one or more processing devices that execute program code, such as a synthetic identity service 120. The program code is stored on a non-transitory computer-readable medium. The synthetic identity service 120 can execute one or more processes for analyzing links between primary entities and secondary identities. The synthetic identity service 120 can determine, from this analysis, that certain primary entity accounts are likely being used to facilitate the creation, maintenance, or use of synthetic identities. The synthetic identity service 120 can also execute one or more processes that facilitate electronic transactions between consumer computing systems 106 and client computing systems 104 by, for example, servicing identity-related queries received from the client computing systems 104 in real time.

In some aspects, the synthetic identity service 120 can include one or more modules, such as a web server module, a web services module, or an enterprise services module, which individually or in combination facilitate electronic transactions. For example, a web server module can be executed by a suitable processing device to provide one or more web pages or other interfaces to a contributor computing system 102, a client computing system 104, or a consumer computing system 106. The web pages or other interfaces can include content provided by the web services module. The web services module can generate this content by executing one or more algorithms using information retrieved from one or more of the account and transaction data 124. The enterprise services module can be executed to retrieve the information from one or more of the account and transaction data 124.

The fraud detection computing system 100 may also include one or more network-attached storage units on which various repositories, databases, or other structures are stored. Examples of these data structures are the identity repository 122 and the authorization database 130. Network-attached storage units may store a variety of different types of data organized in a variety of different ways and from a variety of different sources. For example, the network-attached storage unit may include storage other than primary storage located within fraud detection server 118 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The identity repository 122 can store account and transaction data 124, consumer profiles 126, or both. The account and transaction data 124 can be analyzed by the synthetic identity service 120 to identify primary entity accounts being used to support synthetic identities, secondary entity accounts that belong to synthetic identities, or both. The account and transaction data 124 can be received by a fraud detection server 118 from contributor computing systems 102, generated by the fraud detection server 118 based on communications with contributor computing systems 102, or some combination thereof. The account and transaction data 124 can be stored in, for example, a database or other suitable data source. Suitable data sources can include, for example, secure and credentialed databases or other data structures managed by or otherwise accessible by the synthetic identity service 120.

The account and transaction data 124 can include consumer identification data. Consumer identification data can include any information that can be used to uniquely identify an individual or other entity. In some aspects, consumer identification data can include information that can be used on its own to identify an individual or entity. Non-limiting examples of such consumer identification data include one or more of a legal name, a company name, a social insurance number, a credit card number, a date of birth, an e-mail address, etc. In other aspects, consumer identification data can include information that can be used in combination with other information to identify an individual or entity. Non-limiting examples of such consumer identification data include a street address or other geographical location, employment data, etc.

The identity repository 122 can store any type of account data, transaction data, or both. The identity repository 122 can include internal databases or other data sources that are stored at or otherwise accessible via the private network 128. Non-limiting examples of data stored in identity repository 122 include tradeline data, employment data, income data, tax data, asset data (e.g., property records or verified data regarding other assets possessed by a client), data from service providers (e.g., cable television companies, telecommunications operators, and utility providers), and other types of consumer information.

The consumer profiles 126 can include data regarding respective clients. The data included in the consumer profiles 126 can be received from one or more contributor computing systems 102. In some aspects, data from multiple accounts in the identity repository 122 can be linked to or otherwise associated with a given consumer profile 126 using a referential keying system.

In some aspects, the fraud detection computing system 100 can implement one or more procedures to secure communications between the fraud detection computing system 100 and other client systems. Non-limiting examples of features provided to protect data and transmissions between the fraud detection computing system 100 and other client systems include secure web pages, encryption, firewall protection, network behavior analysis, intrusion detection, etc. In some aspects, transmissions with client systems can be encrypted using public key cryptography algorithms using a minimum key size of 128 bits. In additional or alternative aspects, website pages or other data can be delivered through HTTPS, secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

Examples of Fraud Detection Operations

The fraud detection computing system 100 can execute one or more processes that transmit, in real-time, fraud warnings or other indicators of synthetic fraud risks to client computing systems 104. For instance, client computing systems 104 may be operated by financial institutions that engage in online transactions with remote consumer computing system 106. Synthetic identities may be used to gain unauthorized or illicit access to sensitive data or interactive computing environments provided by the client computing systems 104. For example, an interactive computing environment, which is hosted by a client computing system 104, could be accessed by a consumer computing system 106, where communications from the consumer computing system 106 appear to come from a synthetic identity (e.g., a user who uses one or more aspects of the synthetic identity to hide the user's true identity). The fraud detection computing system 100 creates fraud-facilitation flags that are applied to certain consumer profiles 126.

In some aspects, the fraud detection computing system 100 can facilitate the real-time prevention of fraudulent transaction. Real time operation could involve performing the relevant operations, such as detection and prevention of potentially fraudulent conduct, during an online transaction between the client computing system 104 and a consumer computing system 106. For instance, real time operation could include detecting a potential unauthorized use of a particular function during an electronic transaction within an interactive computing environment (e.g., use by a synthetic identity) and preventing the unauthorized use prior to completion of the transaction.

Figure 2:
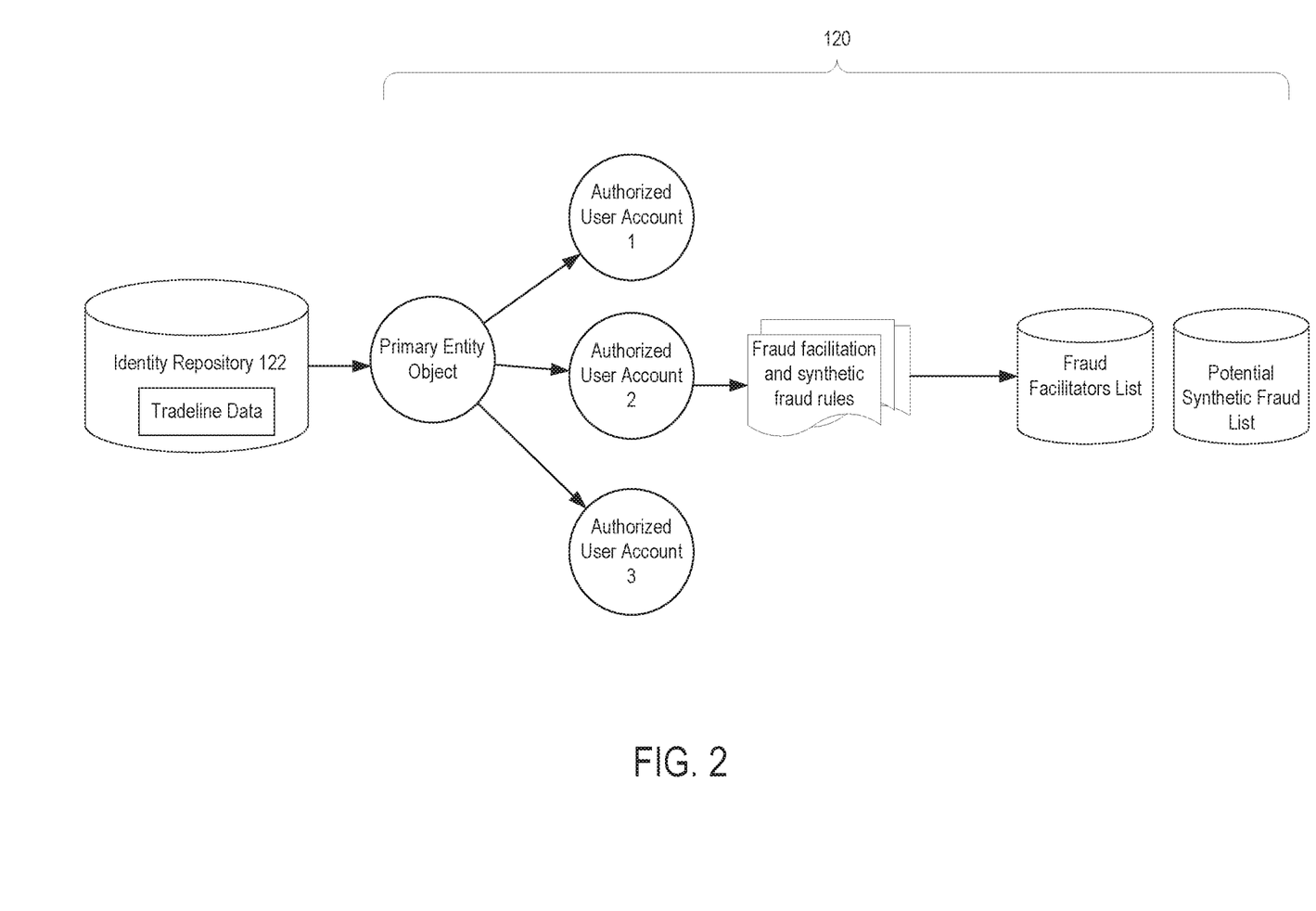
FIG. 2 depicts an example of creating a fraud-facilitation flag used by the synthetic identity service of FIG. 1, according to certain aspects of the present disclosure.

FIG. 2 depicts an example of a data flow for creating these fraud-facilitation flags. In this example, the synthetic identity service 120 retrieves and analyzes data from the identity repository 122. In a simplified example, the synthetic identity service 120 can analyze billions of historical records in the tradeline data from the identity repository 122. This analysis can be performed daily or over any suitable interval (e.g., a shorter or longer interval). In this analysis, the synthetic identity service 120 can identify certain consumer profiles 126 as primary entities and other consumer profiles 126 from the tradelines as secondary entities. The synthetic identity service 120 can create or update a primary entity object, which represent the primary entity, to include links to multiple authorized user accounts. For example, the synthetic identity service 120 can build a single primary entity object (e.g., a consumer profile 126) for a given individual and associate that primary entity object with multiple authorized user accounts (e.g., different credit accounts from different financial institutions). An example of a primary entity is a primary cardholder on a credit account. The synthetic identity service 120 also creates or updates the primary entity object to include links to secondary objects, which represent secondary entities. Examples of secondary entities include both authorized users currently associated with the account and terminated authorized users who are no longer currently associated with the account (e.g., have charged off the account).

Figure 3:
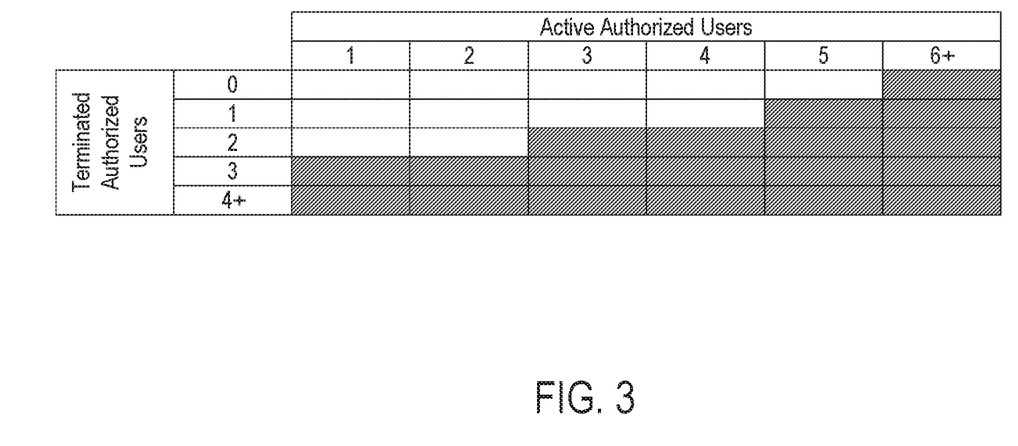
FIG. 3 depicts an example of an analysis of a primary entity object used by the synthetic identity service of FIG. 1, according to certain aspects of the present disclosure.

The synthetic identity service 120 can apply various fraud facilitation and synthetic fraud rules to determine whether a primary entity object should be identified as a fraud facilitator and to determine whether various primary or secondary entity objects should be identified as synthetic identities or other sources of potential synthetic-identity-based fraud. FIG. 3 depicts a simplified example of this analysis with respect to a particular primary entity. In the table depicted in FIG. 3, a fraud-facilitation flag is applied for the scenarios highlighted in the shaded section. For instance, as indicated in the bottom-left corner of the table, if a particular primary entity is associated with an account having one authorized user and a history of three or more terminated users, the primary entity is flagged as potentially facilitating fraud. In this simplified example, the imbalance between active authorized users and terminated authorized user history indicates that account may have been "rented" for the purpose of building a credit history for synthetic identities.

Although FIG. 3 is described using an example of a single account, the synthetic identity service 120 can analyze a history of authorized and terminated users with respect to multiple accounts. For instance, the number of "active authorized users" can be determined for any authorized user accounts linked to a single primary entity object, and the number of "terminated authorized users" can be determined for any current or historical user accounts that are also linked to the primary entity object.

If the analysis indicates that a particular primary entity has potentially engaged in fraud facilitation, the synthetic identity service 120 can apply a fraud-facilitation flag to the primary entity object. For instance, a consumer profile 126 for that entity object can be updated to include the fraud-facilitation flag. In some aspects, consumer profiles 126 with fraud-facilitation flags are moved or copied to a separate repository, such as a "mule barn" identifying potential credit mules.

The fraud detection computing system 100 uses these flags to assist client computing systems 104 with detecting fraud. For instance, during an online transaction with a target consumer, a client computing system 104 transmits a query to the fraud detection computing system 100 regarding whether the target consumer's identity is associated with a synthetic identity or other fraudulent activity. The target consumer may be, for example, a new credit card applicant who has a tradeline as an authorized user on one or more of accounts associated with a flagged consumer profile 126 (e.g., a "mule" account). The fraud detection computing system 100 services the query by identifying the fraud-facilitation flag and transmitting a fraud warning to the client computing system 104. For instance, the fraud warning indicates that the new credit card applicant has been associated with a fraud facilitator account (e.g., a "mule" account), and therefore that the new credit card applicant may be a synthetic identity. Based on receiving the fraud warning, a user of the client computing system 104 can remove the credit application from automated acquisition processes and subject the file to manual review. In manual review, the user of the client computing system 104, such as a bank, might ask for a picture identification or other credential (e.g., an electronic or physical copy of a government-issued identification) that would be difficult to manufacture.

Figure 4:
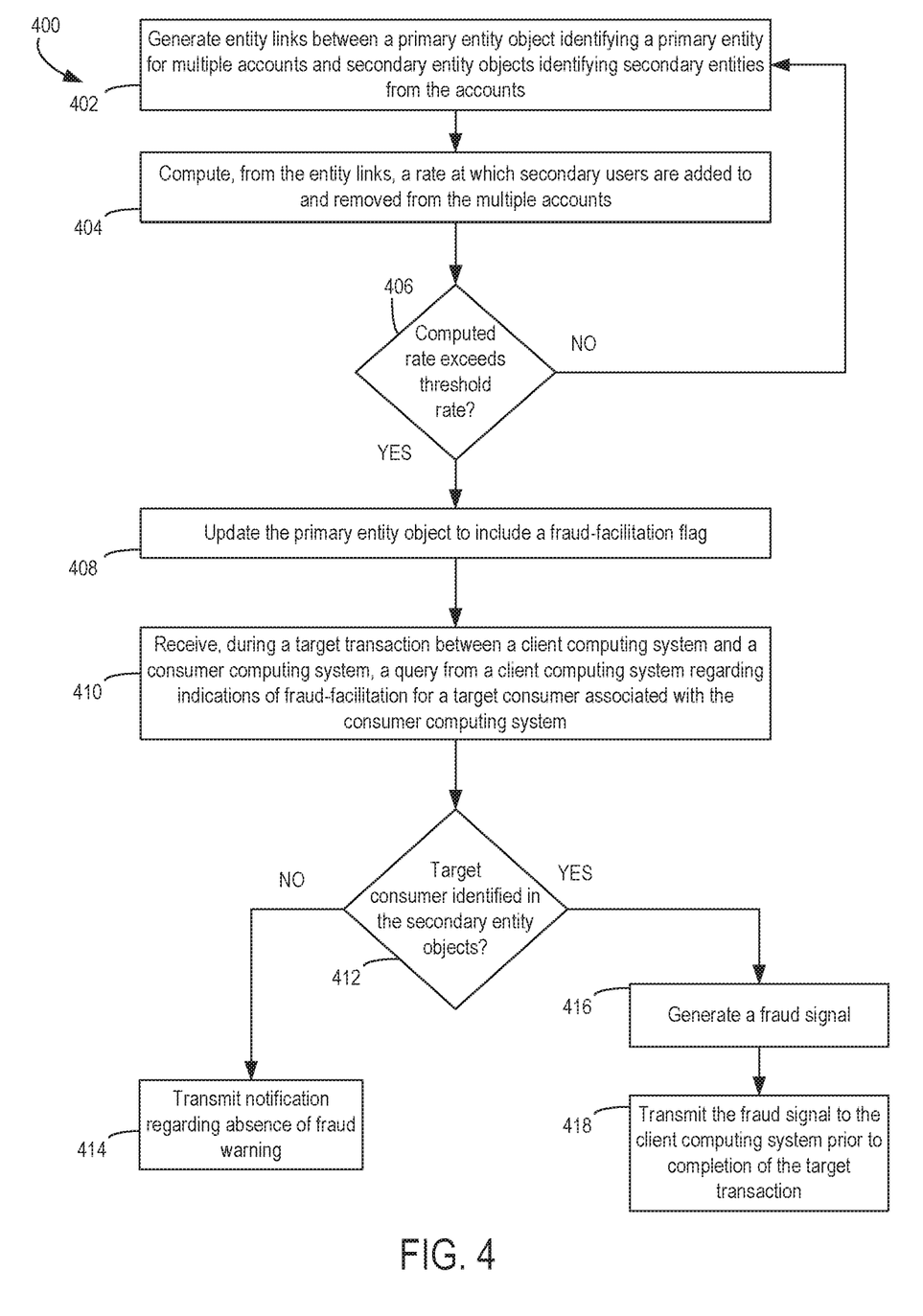
FIG. 4 depicts an example of a process for updating and using an identity repository data structure for detecting synthetic identities that are facilitated by primary entities, according to certain aspects of the present disclosure.

FIG. 4 is a flow chart illustrating an example of a process 400 for updating and using an identity repository data structure for detecting synthetic identities that are facilitated by primary entities. For illustrative purposes, the process 400 is described with reference to implementations described above with respect to one or more examples described herein. Other implementations, however, are possible. In some aspects, the steps in FIG. 4 may be implemented in program code that is executed by one or more computing devices such as the fraud detection server 118 depicted in FIG. 1. In some aspects, one or more operations shown in FIG. 4 may be omitted or performed in a different order. Similarly, additional operations not shown in FIG. 4 may be performed.

At block 402, the process 400 involves generating entity links between a primary entity object identifying a primary entity for multiple accounts and secondary entity objects identifying secondary entities from the accounts. The fraud detection server 118 can execute the synthetic identity service 120 and thereby perform one or more operations for generating links between primary entity objects and secondary entity objects. For example, the synthetic identity service 120 can access, from a non-transitory computer-readable medium, account data and transaction data 124. The synthetic identity service 120 can identify primary entities (e.g., primary cardholders) from the account data and transaction data 124. The synthetic identity service 120 can group different sets of account data and transaction data 124, such as tradelines for different credit accounts, into a primary entity data object, such as a consumer profile 126 having a "primary" identifier. The synthetic identity service 120 can also group different sets of account data and transaction data 124, such as tradelines for different credit accounts, into secondary entity data objects that identify secondary entities (e.g., authorized users added to a credit account). The synthetic identity service 120 can link the primary entity object to a given secondary entity object based, for example, on the tradeline data identifying both the primary entity and the secondary entity as users on an account, parties to an electronic transaction, etc.

The synthetic identity service 120 can communicate with one or more contributor computing systems 102 to obtain the account or transaction data. In some aspects, a contributor external-facing subsystem 110 can communicate with a contributor computing system 102 via a public data network 108, such as the Internet. The contributor external-facing subsystem 110 can establish a secure communication channel, such as an SFTP connection, over the public data network 108 and with the contributor computing system 102. In some aspects, the secure communication channel can be automatically established on a periodic basis (e.g., each week, each bi-week, etc.). In additional or alternative aspects, the secure communication channel can be established by one or more of the computing systems in response to a command received via a user interface. The contributor external-facing subsystem 110 can receive the account or transaction data via the secure communication channel. The contributor external-facing subsystem 110 can transmit the account or transaction data to the fraud detection server 118 via the firewall device 116.

At block 404, the process 400 involves computing, from the entity links, a rate at which secondary users are added to and removed from the multiple accounts. The account or transaction data can describe a set of consumers. The fraud detection server 118 can execute the synthetic identity service 120 and thereby perform one or more operations for computing the rate.

For example, the synthetic identity service 120 can access historical data describing the primary entity object and links to various secondary objects over a time period, such as one year, twenty-four months, etc. The historical data can include account and transaction data with respect to multiple accounts from multiple, independently operated service providers, such as financial institutions. From this historical data, the synthetic identity service 120 can identify a corresponding number of added secondary users and terminated secondary users for the accounts corresponding to the primary entity. The synthetic identity service 120 can compute a rate at which secondary users are added or removed based on the total number of added users for the accounts over the time period, the total number of removed users for the accounts over the time period, or both.

At block 406, the process 400 involves determining whether the computed rate exceeds a threshold rate. The fraud detection server 118 can execute the synthetic identity service 120 and thereby compare the computed rate with the threshold rate. For example, the synthetic identity service 120 can access one or more fraud facilitation rules from a non-transitory computer-readable medium. The fraud facilitation rules can specify a rate of added users or terminated users that is indicative of fraud facilitation. The synthetic identity service 120 can compare the computed rate to the threshold rate.

If the computed rate does not exceed the threshold rate, the process 400 involves returning to block 402. If the computed rate exceeds the threshold rate, the process 400 also involves updating the primary entity object to include a fraud-facilitation flag, as depicted at block 408. The fraud detection server 118 can execute the synthetic identity service 120 and thereby generate the fraud-facilitation flag. For example, the synthetic identity service 120 can retrieve a consumer profile 126, which corresponds to the primary entity, from the identity repository 122 and update the consumer profile 126 to include the fraud-facilitation flag.

In some aspects, the synthetic identity service 120 can execute one or more operations for detecting false positives with respect to fraud facilitation. For example, the synthetic identity service 120 can receive or otherwise access supplementary data identifying the primary entity and one or more secondary entities. Examples of this supplementary data include property records, tax records, legal records, education records, etc. The supplementary data can indicate that some external relationship (e.g., marital, familial, etc.) exists between the primary entity and the secondary entity. An external relationship can be independent of electronic transactions between the primary entity and the secondary entity. For example, records that identify a marital or familial relationship between entities can indicate that neither entity is synthetic. The synthetic identity service 120 can remove (or decline to apply) a fraud-facilitation flag based on verifying that such an external relationship exists. For example, the numbers of existing authorized users and terminated users for a given primary entity object may be reduced based on some of the authorized users and terminated users having verified external relationships to a primary user.

At block 410, the process 400 involves receiving, during a target transaction between a client computing system and a consumer computing system, a query from a client computing system regarding indications of fraud-facilitation for a target consumer associated with the consumer computing system. The fraud detection server 118 can execute the synthetic identity service 120 and thereby perform one or more operations for communicating with a client computing system 104 to receive a query. The query can include any suitable query parameters for identifying one or more consumer entities. Examples of query parameters include PII data and a request to check for indications of synthetic-identity-based fraud, fraud-facilitation, or both. In some aspects, multiple queries can be bundled into a batch request. For example, hundreds or thousands of queries may be included in a batch request from client computing system 104 that services a large client entity (e.g., large lenders, etc.). The process 400, including the operations described below, can be automatically applied to service the hundreds or thousands of queries in the batch request.

An example of a target transaction is an online transaction performed within an interactive computing environment provided by the client computing system 104. For instance, the client computing system 104 can establish a session with a consumer computing system 106. The consumer computing system 106 can communicate with the client computing system 104 via the interactive computing environment during the session. Different states of the interactive computing environment can be used to initiate, conduct, and complete the online transaction. In some aspects, the client computing system 104 can selectively grant or deny access to one or more functions within the interactive computing environment that are used to move between different states of the interactive computing environment.

In some aspects, the client external-facing subsystem 112 can communicate with a client computing system 104 via a public data network 108, such as the Internet. The client external-facing subsystem 112 can establish a secure communication channel (e.g., an SFTP connection, an HTTP connection, etc.) over the public data network 108 and with the client computing system 104. In some aspects, the secure communication channel can be automatically established on a periodic basis (e.g., each week, each bi-week, etc.). In additional or alternative aspects, the secure communication channel can be established by one or more of the computing systems in response to a command received via a web interface that is provided from the fraud detection computing system 100 (e.g., using the client external-facing subsystem 112) to the client computing system 104. The client external-facing subsystem 112 can receive one or more queries via the secure communication channel. The client external-facing subsystem 112 can transmit the query to the fraud detection server 118 via the firewall device 116.

At block 412, the process 400 involves determining whether the target consumer is identified in the secondary entity objects. The fraud detection server 118 can execute the synthetic identity service 120 and thereby perform one or more operations for determining whether the target consumer is identified in the secondary entity objects. For example, the synthetic identity service 120 can extract parameter data identifying the target consumer (e.g., PII) from the received query. The synthetic identity service 120 can search customer profiles 126 and identify any customer profiles 126 that match the extracted parameter data. The synthetic identity service 120 can review the identified customer profiles 126 to determine if they are included in a potential synthetic-fraud list. For instance, the identified customer profiles 126 may be flagged with an indicator of a relationship to a primary entity, which has in turn been flagged as a potential fraud-facilitator.

If the target consumer is not identified in the secondary entity objects, the process involves transmitting, to the client computing system 104, a notification indicating that no fraud warning has been identified with respect to the target consumer.

If the target consumer is identified in the secondary entity objects, the process involves generating a fraud signal, as depicted at block 416. In some aspects, the fraud signal include a fraud warning. For instance, if a primary entity linked to the target consumer has in turn been flagged as a potential fraud-facilitator, as described above with respect to block 412, the synthetic identity service 120 generates a fraud warning message. The fraud warning message can include any suitable data indicating that the target consumer may be a synthetic identity. Examples of this data include a recommendation to perform additional verification of the target consumer's identity, a notice that the target consumer has been linked to a potential fraud facilitator (e.g., a "credit mule"), etc. In additional or alternative aspects, the fraud signal can include instructions or suggestions to deny access to one or more functions within an interactive computing environment that allow the target transaction to be completed.

At block 418, the process 400 involves transmitting the fraud signal to the client computing system prior to completion of the target transaction. In some aspects, transmitting the fraud signal can prevent the consumer computing system 106 from completing the transaction with the client computing system 104. In one example, transmitting the fraud signal can cause the client computing system 104 to deny access to one or more functions within an interactive computing environment that allow the target transaction to be completed.

For example, a fraud signal could include a warning or other notification that the synthetic identity service 120 has generated a fraud warning or other indicator of unauthorized use. The synthetic identity service 120 can configure a network interface device of the fraud detection computing system 100 to transmit the fraud signal to the client computing system 104. The client computing system 104 can perform, based on receiving the fraud signal, one or more operations for preventing the consumer computing system 106 from accessing a function that advances the state of the interactive computing environment. Examples of these operations include terminating a session between the consumer computing system 106 and the client computing system 104, requiring the input of additional verification data (e.g., knowledge-based authentication data, biometrics, etc.) at the consumer computing system 106 before providing access to the function of the interactive computing environment, rejecting a request to access the function, etc.

In a simplified example, the process 400 can be implemented using trade line data. In this example, the synthetic identity service 120 extracts a national trade line table from the identity repository 122. The synthetic identity service 120 executes a trade-linking algorithm that matches national individual trades with an authorized user and terminated trades. The trade-linking algorithm extracts a list of authorized users (i.e., primary and second entities) that have activity or relationship indicative of fraud facilitation, synthetic identity activity, or both. The synthetic identity service 120 groups users from this list into a group of potential fraud facilitators, who are users with suspicious trends or other behavior with respect to authorized account users, and a group of potential fraudsters, who have a suspicious trade line on their file indicative of fraud using synthetic identities. In real time (e.g., during an online transaction), the synthetic identity service 120 receives a query regarding a target consumer, determines whether the target consumer is associated with one or more of the group of potential fraud facilitators and the group of potential fraudsters, and outputs a suitable fraud warning to the client from which the query was received.

Example of Computing Environment for Synthetic Identity Service

Figure 5:
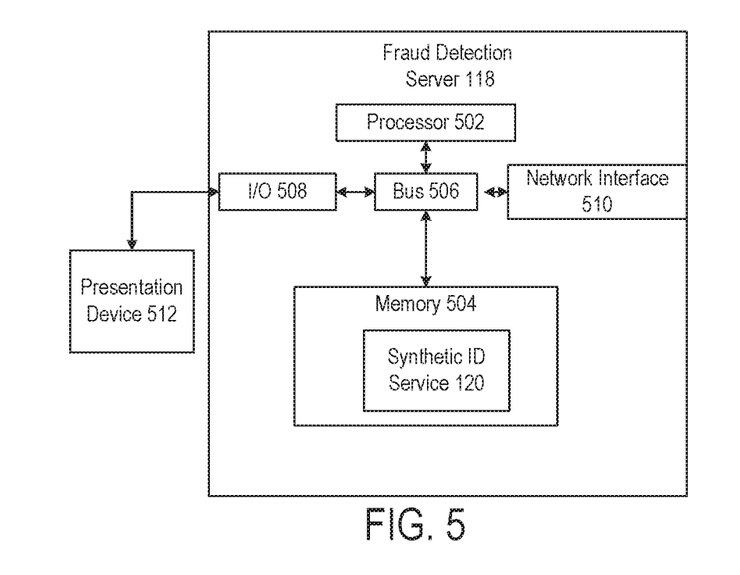
FIG. 5 depicts an example of a computing system for implementing the synthetic identity service of FIG. 1, according to certain aspects of the present disclosure.

Any suitable computing system or group of computing systems can be used to perform the operations for detecting synthetic identities described herein. For example, FIG. 5 is a block diagram depicting an example of a fraud detection server 118. The example of the fraud detection server 118 can include various devices for communicating with other devices in the fraud detection computing system 100, as described with respect to FIG. 1. The fraud detection server 118 can include various devices for performing one or more transformation operations described above with respect to FIGS. 1-5.

The fraud detection server 118 can include a processor 502 that is communicatively coupled to a memory 504. The processor 502 executes computer-executable program code stored in the memory 504, accesses information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices, including one. The processor 502 can include or communicate with a memory 504. The memory 504 stores program code that, when executed by the processor 502, causes the processor to perform the operations described in this disclosure.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C #, Visual Basic, Java, Python, Perl, JavaScript, ActionScript, etc.

The fraud detection server 118 may also include a number of external or internal devices such as input or output devices. For example, the fraud detection server 118 is shown with an input/output interface 508 that can receive input from input devices or provide output to output devices. A bus 506 can also be included in the fraud detection server 118. The bus 506 can communicatively couple one or more components of the fraud detection server 118.

The fraud detection server 118 can execute program code that includes the synthetic identity service 120. The program code for the synthetic identity service 120 may be resident in any suitable computer-readable medium and may be executed on any suitable processing device. For example, as depicted in FIG. 5, the program code for the synthetic identity service 120 can reside in the memory 504 at the fraud detection server 118. Executing the synthetic identity service 120 can configure the processor 502 to perform the operations described herein.

In some aspects, the fraud detection server 118 can include one or more output devices. One example of an output device is the network interface device 510 depicted in FIG. 5. A network interface device 510 can include any device or group of devices suitable for establishing a wired or wireless data connection to one or more data networks described herein. Non-limiting examples of the network interface device 510 include an Ethernet network adapter, a modem, etc.

Another example of an output device is the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc. In some aspects, the presentation device 512 can include a remote client-computing device that communicates with the fraud detection server 118 using one or more data networks described herein. In other aspects, the presentation device 512 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A fraud detection computing system comprising:
   a contributor external-facing device configured for communicating with a fraud detection server system through a security portal and for obtaining, via communications with contributor computing systems over a public data network, transaction data and account data for online entities;
   a client external-facing device configured for:
      receiving, from a client computing system and during a target transaction between the client computing system and a consumer computing system, a query regarding a presence of a fraud warning for a target consumer associated with the consumer computing system, and
      transmitting, prior to completion of the target transaction, the fraud warning to the client computing system,
   in a secured part of the fraud detection computing system:
      an identity repository to securely store the account data and the transaction data obtained from the contributor computing systems; and
      the fraud detection server system configured for:
         generating, in a data structure and based on at least some of the account data and the transaction data, entity links between a primary entity object identifying a primary entity for multiple accounts and secondary entity objects identifying secondary entities from the accounts,
         determining, from the entity links, that a rate at which secondary users are added to and removed from the accounts exceeds a threshold rate,
         updating, based on the rate exceeding the threshold rate, the primary entity object to include a fraud-facilitation flag, and
         generating, responsive to the query, the fraud warning based on the target consumer being identified in the secondary entity objects.

2. The fraud detection computing system of claim 1, wherein the fraud detection server system is further configured for causing the client computing system to prevent the consumer computing system from accessing a function for advancing the target transaction within an interactive computing environment hosted by the client computing system, wherein causing the client computing system to prevent the consumer computing system from accessing the function comprises transmitting the fraud warning to the client computing system.

3. The fraud detection computing system of claim 1, wherein the target transaction comprises one or more of:
   accessing sensitive data stored by the client computing system; and
   operating an electronic tool within an interactive computing environment hosted by the client computing system.

4. The fraud detection computing system of claim 1, wherein the fraud detection server system is further configured for generating the fraud-facilitation flag based on a ratio of existing secondary users on the accounts to terminated secondary users on the accounts.

5. The fraud detection computing system of claim 1, wherein the fraud detection server system is further configured for:
   generating, in the data structure and based on at least some of the account data and the transaction data, additional entity links between an additional primary entity object identifying an additional primary entity for additional accounts and additional secondary entity objects identifying additional secondary entities from the additional accounts;
   determining, from the additional entity links, that an additional rate at which secondary users are added to and removed from the accounts exceeds the threshold rate;
   updating, based on the rate exceeding the threshold rate, the additional primary entity object to include an additional fraud-facilitation flag;
   receiving supplementary data identifying the additional primary entity and the additional secondary entities;
   verifying, from the supplementary data, that external relationships exist between the additional primary entity and the additional secondary entities, wherein each external relationship is identifiable independently of electronic transactions among the additional primary entity and the additional secondary entities; and
   removing the additional fraud-facilitation flag based on verifying that the external relationships exist.

6. The fraud detection computing system of claim 1, wherein the fraud detection server system is further configured for:
   generating, in the data structure and based on at least some of the account data and the transaction data, additional entity links between an additional primary entity object identifying an additional primary entity for additional accounts and additional secondary entity objects identifying additional secondary entities from the additional accounts;
   determining, from the additional entity links, that an additional rate at which secondary users are added to and removed from the accounts exceeds the threshold rate;

accessing, based on determining that the additional rate exceeds the threshold rate, supplementary data identifying the additional primary entity and the additional secondary entities;

verifying, from the supplementary data, that external relationships exist between the additional primary entity and the additional secondary entities, wherein each external relationship is identifiable independently of electronic transactions among the additional primary entity and the additional secondary entities; and outputting, based on verifying that the external relationships exist, a decision to omit an additional fraud-facilitation flag from the additional primary entity.

7. A computing system comprising:

a client computing system configured for:
  establishing, with a consumer computing system, a session for accessing an interactive computing environment hosted by the client computing system, and
  transmitting a query for a target transaction within the interactive computing environment, the query requesting information regarding a presence of a fraud warning for a target consumer associated with the consumer computing system; and a fraud detection server system communicatively coupled to the client computing system and configured for:
  generating, in a data structure and based on account data and transaction data obtained from contributor computing systems, entity links between a primary entity object identifying a primary entity for multiple accounts and secondary entity objects identifying secondary entities from the accounts,
  determining, from the entity links, that a rate at which secondary users are added to and removed from the accounts exceeds a threshold rate,
  updating, based on the rate exceeding the threshold rate, the primary entity object to include a fraud-facilitation flag,
  receiving the query, and
  transmitting, to the client computing system and based on the target consumer being identified in the secondary entity objects, a response to the query regarding the fraud warning, wherein the client computing system is further configured for modifying the interactive computing environment based on the response to the query.

8. The computing system of claim 7, wherein the client computing system is further configured for modifying the interactive computing environment by preventing the consumer computing system from accessing a function for advancing the target transaction within the interactive computing environment.

9. The computing system of claim 8, wherein preventing the consumer computing system from accessing the function comprises terminating the session.

10. The computing system of claim 8, wherein preventing the consumer computing system from accessing the function comprises providing, within the interactive computing environment, an interface for performing one or more verification operations required for accessing the function.

11. The computing system of claim 7, wherein the fraud detection server system is further configured for generating the fraud-facilitation flag based on a ratio of existing secondary users on the accounts to terminated secondary users on the accounts.

12. The computing system of claim 7, wherein the fraud detection server system is further configured for:

generating, in the data structure and based on at least some of the account data and the transaction data, additional entity links between an additional primary entity object identifying an additional primary entity for additional accounts and additional secondary entity objects identifying additional secondary entities from the additional accounts;

determining, from the additional entity links, that an additional rate at which secondary users are added to and removed from the accounts exceeds the threshold rate;

updating, based on the rate exceeding the threshold rate, the additional primary entity object to include an additional fraud-facilitation flag;

receiving supplementary data identifying the additional primary entity and the additional secondary entities;

verifying, from the supplementary data, that external relationships exist between the additional primary entity and the additional secondary entities, wherein each external relationship is identifiable independently of electronic transactions among the additional primary entity and the additional secondary entities; and removing the additional fraud-facilitation flag based on verifying that the external relationships exist.

13. The computing system of claim 7, wherein the fraud detection server system is further configured for:

generating, in the data structure and based on at least some of the account data and the transaction data, additional entity links between an additional primary entity object identifying an additional primary entity for additional accounts and additional secondary entity objects identifying additional secondary entities from the additional accounts;

determining, from the additional entity links, that an additional rate at which secondary users are added to and removed from the accounts exceeds the threshold rate;

accessing, based on determining that the additional rate exceeds the threshold rate, supplementary data identifying the additional primary entity and the additional secondary entities;

verifying, from the supplementary data, that external relationships exist between the additional primary entity and the additional secondary entities, wherein each external relationship is identifiable independently of electronic transactions among the additional primary entity and the additional secondary entities; and outputting, based on verifying that the external relationships exist, a decision to omit an additional fraud-facilitation flag from the additional primary entity.

14. The computing system of claim 7, wherein the fraud detection server system is further configured for moving a profile corresponding to the primary entity object to a repository marked as fraud-facilitation profiles.

15. A method in which one or more processing devices of a fraud detection computing system perform operations comprising:

generating, in a data structure and based on account data and transaction data stored in an identity repository, entity links between a primary entity object identifying a primary entity for multiple accounts and secondary entity objects identifying secondary entities from the accounts, determining, from the entity links, that a rate at which secondary users are added to and removed from the accounts exceeds a threshold rate, updating, based on the rate exceeding the threshold rate, the primary entity object to include a fraud-facilitation flag;

receiving, from a client computing system and during a target transaction between the client computing system and a consumer computing system, a query regarding a presence of a fraud warning for a target consumer associated with the consumer computing system;

generating, responsive to the query, the fraud warning based on the target consumer being identified in the secondary entity objects associated with the primary entity object having the fraud-facilitation flag; and transmitting, prior to completion of the target transaction, the fraud warning to the client computing system.

16. The method of claim 15, wherein transmitting the fraud warning to the client computing system causes the client computing system to prevent the consumer computing system from accessing a function for advancing the target transaction within an interactive computing environment hosted by the client computing system.

17. The method of claim 15, the operations further comprising generating the fraud-facilitation flag based on a ratio of existing secondary users on the accounts to terminated secondary users on the accounts.

18. The method of claim 15, the operations further comprising:

generating, in the data structure and based on at least some of the account data and the transaction data, additional entity links between an additional primary entity object identifying an additional primary entity for additional accounts and additional secondary entity objects identifying additional secondary entities from the additional accounts;

determining, from the additional entity links, that an additional rate at which secondary users are added to and removed from the accounts exceeds the threshold rate;

updating, based on the rate exceeding the threshold rate, the additional primary entity object to include an additional fraud-facilitation flag;

receiving supplementary data identifying the additional primary entity and the additional secondary entities;

verifying, from the supplementary data, that external relationships exist between the additional primary entity and the additional secondary entities, wherein each external relationship is identifiable independently of electronic transactions among the additional primary entity and the additional secondary entities; and removing the additional fraud-facilitation flag based on verifying that the external relationships exist.

19. The method of claim 15, the operations further comprising:

generating, in the data structure and based on at least some of the account data and the transaction data, additional entity links between an additional primary entity object identifying an additional primary entity for additional accounts and additional secondary entity objects identifying additional secondary entities from the additional accounts;

determining, from the additional entity links, that an additional rate at which secondary users are added to and removed from the accounts exceeds the threshold rate;

accessing, based on determining that the additional rate exceeds the threshold rate, supplementary data identifying the additional primary entity and the additional secondary entities;

verifying, from the supplementary data, that external relationships exist between the additional primary entity and the additional secondary entities, wherein each external relationship is identifiable independently of electronic transactions among the additional primary entity and the additional secondary entities; and outputting, based on verifying that the external relationships exist, a decision to omit an additional fraud-facilitation flag from the additional primary entity.

20. The method of claim 15, the operations further comprising moving a profile corresponding to the primary entity object to a repository marked as fraud-facilitation profiles.

\* \* \* \* \*